A. SULLIVAN.
FILTER.
APPLICATION FILED OCT. 16, 1913.

1,084,978.

Patented Jan. 20, 1914.

Witnesses

Inventor
Antonio Sullivan,
By
Attorney

UNITED STATES PATENT OFFICE.

ANTONIO SULLIVAN, OF BRIDGEPORT, CONNECTICUT.

FILTER.

1,084,978.  Specification of Letters Patent.  Patented Jan. 20, 1914.

Application filed October 16, 1913. Serial No. 795,415.

*To all whom it may concern:*

Be it known that I, ANTONIO SULLIVAN, a citizen of the United States, residing in the city of Bridgeport, county of Fairfield, State of Connecticut, have invented certain new and useful Improvements in Filters; and I do declare the following to be a full, clear, and exact description of the invention, such as will enable others skilled in the art to which it appertains to make and use the same.

This invention relates to new and useful improvements in filters, and the primary object thereof is to provide a filter which is of simple, and economical construction, and which involves a minimum of parts capable of being cheaply manufactured and assembled.

Further, the invention aims to provide a filter which is efficient in use, and one which has means incorporated therein for effectually protecting the filtering material against the force of the incoming water.

Figure 1:
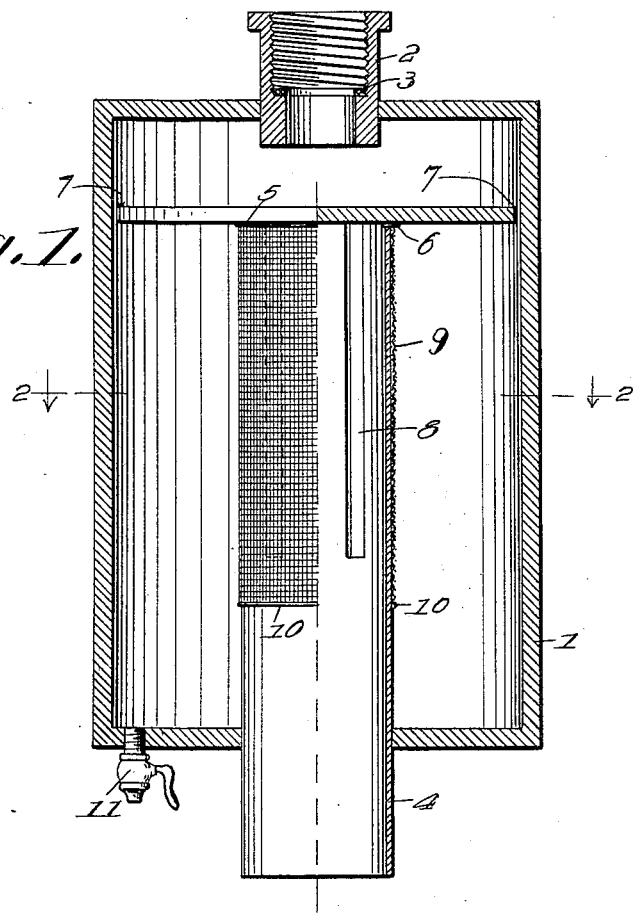
Figure 2:
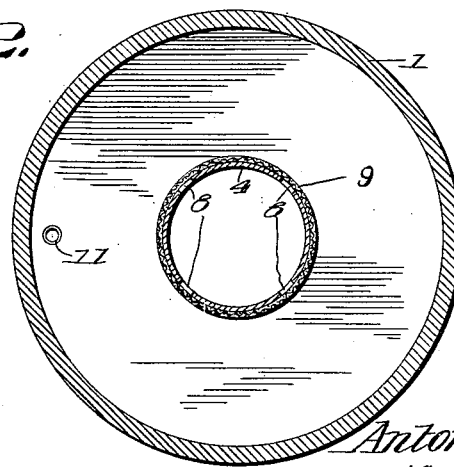

In the drawings: Figure 1 is a vertical sectional view of the invention, parts being shown in side elevation; and Fig. 2 is a section taken on the line 2—2 of Fig. 1.

The invention includes a preferably cylindrical body or casing 1, closed at its ends, the upper end being formed with an opening wherein is received and suitably secured an interiorly threaded nipple 2, for attachment to the faucet, a gasket 3 being seated within the nipple to make a water-tight connection with the faucet. The lower end of the casing is also formed with an opening through which a pipe 4, passes, and is rigidly secured in any suitably or preferred manner. The upper end of the pipe 4 alines with and extends below the nipple 3, in spaced relation thereto, and has a solid plate or disk 5 of imperforate character soldered to its upper free edge, as indicated at 6. The marginal edges of the disk or plate 5 extend in close proximity to the inner circumference of the casing 2 so as to form a continuous restricted water passage 7, between the disk and casing. The plate 5 serves as a closure for the top end of pipe 4, preventing the incoming water from entering same and by virtue of being located adjacent to the casing interior provides the water passage 7. The pipe 4, is provided with a plurality of spaced, and preferably parallel, elongated openings or slots 8, which extend from points above the casing bottom through the free upper end of the pipe. The purpose of spacing the lower ends of the slots 8, from the casing bottom is to enable the lower end of pipe 4 and the adjacent portions of the casing to provide a sediment chamber in which foreign matter and substances held in the water may collect below the lower ends of the slots 8, and be retained below the latter.

The filter proper 9 is composed of extremely fine wire mesh, which latter is soldered at its upper end to the baffle plate 5, and at its lower end extends below the slots 8, and is soldered to the pipe 4, at 10, the mesh fabric being tightly drawn about the periphery of the pipe 4, so as to snugly engage same. The lower end of the pipe 4, projects for a distance below the bottom of the casing and thereby serves the function of a discharge or outlet for the filtered water.

In operation, water from the faucet entering the casing strikes the baffle plate 5 which thereby breaks the force of the water and disintegrates any foreign matter or substances, which latter cannot pass through the restricted passage 7, unless smaller than the latter, and if small enough to pass through said passage, same can also be drained from the casing through the refuse cock 11, for which reason the passage 7 has its size of predetermined extent. The water collecting on the bottom of the casing will rise and flow through the filtering material and thence passing through slots 8 will enter the interior of the pipe 4, after which the water will pass down through the pipe and be discharged.

What is claimed is:

In a filter, a casing, a pipe of uniform diameter having its lower end completely projected through the casing bottom and having slots which extend from points considerably above the casing bottom through the upper end of the pipe whereby to leave an imperforate lower portion on said pipe which imperforate lower portion forms a wall of a sediment chamber the other wall of which is formed by the lower side wall of the casing, a baffle plate secured to the upper edge of the pipe and extending beyond the pipe periphery and terminating in slightly spaced relation to the inner circumference of the casing, filtering material surrounding the pipe and slots thereof and having its lower edge terminating at points slightly below the slots and having its upper edge secured to the under face of the baffle plate so as to completely inclose the slots, and a nipple projected from the top of the casing and having its lower end terminating adjacent to the upper face of the baffle plate.

In testimony whereof I affix my signature in presence of two witnesses.

ANTONIO SULLIVAN.

Witnesses:
F. W. SMITH, Jr.,
M. T. LONGDEN.

Copies of this patent may be obtained for five cents each, by addressing the "Commissioner of Patents, Washington, D. C."